US009898431B1

(12) United States Patent
Bishara et al.

(10) Patent No.: US 9,898,431 B1
(45) Date of Patent: Feb. 20, 2018

(54) METHOD AND APPARATUS FOR MEMORY ACCESS

(71) Applicant: MARVELL ISRAEL (M.I.S.L) LTD., Yokneam (IL)

(72) Inventors: Amir Bishara, Tel-Aviv Jaffa (IL); Lior Valency, Tel-Aviv (IL); Rami Zemach, Givat Shapira (IL)

(73) Assignee: MARVELL ISRAEL (M.I.S.L) LTD., Yokneam (IL)

( * ) Notice: Subject to any disclaimer, the term of this patent is extended or adjusted under 35 U.S.C. 154(b) by 71 days.

(21) Appl. No.: 15/059,919

(22) Filed: Mar. 3, 2016

Related U.S. Application Data

(60) Provisional application No. 62/129,498, filed on Mar. 6, 2015.

(51) Int. Cl.
*G06F 12/00* (2006.01)
*G06F 13/28* (2006.01)
*G06F 13/16* (2006.01)
*G06F 13/42* (2006.01)

(52) U.S. Cl.
CPC ........ *G06F 13/287* (2013.01); *G06F 13/1663* (2013.01); *G06F 13/4234* (2013.01)

(58) Field of Classification Search
CPC . G06F 13/287; G06F 13/1663; G06F 13/4234
See application file for complete search history.

(56) References Cited

U.S. PATENT DOCUMENTS

| 7,467,256 | B2* | 12/2008 | Jain | H04L 45/7453 365/49.1 |
| 8,656,117 | B1* | 2/2014 | Wong | G06F 9/3824 710/56 |
| 2003/0196058 | A1* | 10/2003 | Ramagopal | G06F 13/1615 711/169 |

* cited by examiner

*Primary Examiner* — Kalpit Parikh

(57) ABSTRACT

Aspects of the disclosure provide a circuit that includes a plurality of memory access circuits configured to access a memory to read or write data of a first width. The memory includes a plurality of memory banks that are organized in hierarchy. Further, the circuit includes a plurality of interface circuits respectively associated with the plurality of memory access circuits. Each interface circuit is configured to receive memory access requests to first level memory banks from an associated memory access circuit, segment the memory access requests into sub-requests to corresponding second level memory banks, buffer the sub-requests into buffers associated with the second level memory banks. In addition, the circuit includes arbitration circuitry configured to control multiplexing paths from the buffers to the second level memory banks to enable, in a same memory access clock, memory accesses by the memory access circuits.

22 Claims, 7 Drawing Sheets

|  | Multiplexer Select | | Data Paths |
|---|---|---|---|
| Clock Cycle 1 | S.234(A)=1<br>S.234(B)=2<br>S.261=A<br>S.271=A | S.235(A)=1<br>S.235(B)=2<br>S.262=B<br>S.272=B | 232(A).B1->241<br>233(A).B1->251<br>232(B).B2->242<br>233(B).B2->252 |
| Clock Cycle 2 | S.234(A)=2<br>S.234(B)=3<br>S.262=A<br>S.272=A | S.235(A)=2<br>S.235(B)=3<br>S.263=B<br>S.273=B | 232(A).B2->242<br>233(A).B2->252<br>232(B).B3->243<br>233(B).B3->253 |
| Clock Cycle 3 | S.234(A)=3<br>S.234(B)=4<br>S.263=A<br>S.273=A | S.235(A)=3<br>S.235(B)=4<br>S.264=B<br>S.274=B | 232(A).B3->243<br>233(A).B3->253<br>232(B).B4->244<br>233(B).B4->254 |
| Clock Cycle 4 | S.234(A)=4<br>S.234(B)=5<br>S.264=A<br>S.274=A | S.235(A)=4<br>S.235(B)=5<br>S.265=B<br>S.275=B | 232(A).B4->244<br>233(A).B4->254<br>232(B).B5->245<br>233(B).B5->255 |
| Clock Cycle 5 | S.234(A)=5<br>S.234(B)=6<br>S.265=A<br>S.275=A | S.235(A)=5<br>S.235(B)=6<br>S.266=B<br>S.276=B | 232(A).B5->245<br>233(A).B5->255<br>232(B).B6->246<br>233(B).B6->256 |
| Clock Cycle 6 | S.234(A)=6<br>S.234(B)=7<br>S.266=A<br>S.276=A | S.235(A)=6<br>S.235(B)=7<br>S.267=B<br>S.277=B | 232(A).B6->246<br>233(A).B6->256<br>232(B).B7->247<br>233(B).B7->257 |
| Clock Cycle 7 | S.234(A)=7<br>S.234(B)=8<br>S.267=A<br>S.277=A | S.235(A)=7<br>S.235(B)=8<br>S.267=B<br>S.277=B | 232(A).B7->247<br>233(A).B7->257<br>232(B).B8->248<br>233(B).B8->258 |
| Clock Cycle 8 | S.234(A)=8<br>S.234(B)=1<br>S.268=A<br>S.278=A | S.235(A)=8<br>S.235(B)=1<br>S.261=B<br>S.271=B | 232(A).B8->248<br>233(A).B8->258<br>232(B).B1->241<br>233(B).B1->251 |

*FIG. 4*

METHOD AND APPARATUS FOR MEMORY ACCESS

INCORPORATION BY REFERENCE

This present disclosure claims the benefit of U.S. Provisional Application No. 62/129,498, "HIERARCHAL LOAD BALANCED MEMORY" filed on Mar. 6, 2015, which is incorporated herein by reference in its entirety.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

In various devices, memory is shared among memory access sources. In an example, a network switching device includes a large number of ports, and a plurality of switching cores to process packets received from the ports and to determine ports via which the packets should be subsequently transmitted. Further, the network switching device includes a memory to store various data, such packets, control tables, forwarding tables and the like. The memory is accessed by the ports and/or the switching cores.

SUMMARY

Aspects of the disclosure provide a circuit that includes a plurality of memory access circuits. The plurality of memory access circuits is configured to access a memory to read or write data of a first width. The memory includes a plurality of memory banks that are organized in hierarchy, a first level memory bank of the first width includes multiple second level memory banks of a second width that is smaller than the first width. Further, the circuit includes a plurality of interface circuits respectively associated with the plurality of memory access circuits. Each interface circuit is configured to receive memory access requests to first level memory banks from an associated memory access circuit, segment the memory access requests into sub-requests to corresponding second level memory banks, buffer the sub-requests into buffers associated with the second level memory banks. In addition, the circuit includes arbitration circuitry configured to control multiplexing paths from the buffers to the second level memory banks to enable memory accesses in a same memory access cycle, from different memory access circuits to different second level memory banks within a same first level memory bank.

According to an aspect of the disclosure, the arbitration circuitry is configured to control the multiplexing paths to enable, in a same memory access cycle, memory accesses from one of the memory access circuits to two or more second level memory banks that are respectively in different first level memory banks. Each memory access circuit is associated with a plurality of ports for receiving/transmitting packets, and is configured to generate memory access requests in response to operations of the plurality of ports.

In an embodiment, each interface circuit includes a distributor circuit configured to segment a memory access request into sub-requests and distribute the sub-quests to the buffers associated with the second level memory banks. Further, the interface circuit includes an identification allocator configured to assign identifications to sub-requests segmented from a read request to read a data piece of the first width from the memory. A second level memory bank is configured to receive a sub-request with an identification and return a data unit with the identification in response to the sub-request. Then, the interface circuit is configured to receive data units with identifications, re-order the data units according to the identifications and assemble the data units into a data piece. In an example, the interface circuit includes an interface memory with memory spaces allocated according to the identifications to store the data units into the memory spaces allocated according to the identifications to re-order the data units and assemble the data units.

In an embodiment, each interface circuit includes first multiplexers respectively corresponding to the first level memory banks, a first multiplexer corresponding to a first level memory bank is configured to select a buffer from a group of buffers that buffer sub-requests for a memory access request to the first level memory bank, and direct a sub-request from the selected buffer to the first level memory bank. Further, in an example, the circuit includes second multiplexers respectively associated with second level memory banks, a second multiplexer associated with a second level memory bank in a first level memory bank is configured to select one of the interface circuits to provide a sub-request to the second level memory bank.

According to an aspect of the disclosure, the arbitration circuit is configured to control each of the first multiplexers to select a buffer from a group of buffers according to time-division-multiplexing (TDM) to cause different sub-requests of a same request to access different second level memory banks of a same first level memory bank in different memory access cycles. Further, the arbitration circuitry is configured to control each of the second multiplexers to select one of the interface circuits according to the time-division-multiplexing (TDM) to cause different interface circuits to access the same second level memory banks at different memory access cycles.

In an example, the arbitration circuitry is configured, in different memory access cycles, to cause different sub-requests of the same request to access different second level memory banks of the same first level memory bank.

Aspects of the disclosure provide a method for using a memory. The method includes receiving memory access requests from a plurality of memory access clients to a memory. The memory includes a plurality of memory banks that are organized in hierarchy, a first level memory bank of the first width includes multiple second level memory banks of a second width that is smaller than the first width, and a memory access request writes/reads a data piece of the first width to/from one of the first level memory banks. Then, the method includes segmenting first memory access requests from a first memory access client into first sub-requests to the second level memory banks, segmenting second memory access quests from a second memory access client into second sub-requests to the second level memory banks, buffering first sub-requests into first buffers associated with the second level memory banks, buffering second sub-requests into second buffers associated with the second level memory banks, and controlling multiplexing paths from the first buffers and the second buffers to the second level memory banks to enable, in a same memory access cycle, memory accesses from first memory access client and the second memory access client to different second level memory banks within a same first level memory bank.

Aspects of the disclosure provide a network device. The network device includes a plurality of ingress ports configured to receive data packets from one or more network devices on a network, one or more packet processors configured process received data packets to make a forwarding decision for received data packets, a plurality of egress ports configured to output the data packets to the one or more network devices on the network based on the forwarding decision, and memory configured to buffer the received data packets, during processing of the data packets at the one or more packet processors. The memory includes a plurality of separately addressable memory banks. The network device includes a plurality of memory access circuits coupled to the ingress ports and the egress ports to buffer the received data packets from the ingress ports to the memory and provide the buffered data packets from the memory to the egress ports. The memory access circuits access the memory to read or write data of a first width. The memory includes a plurality of memory banks that are organized in hierarchy. A first level memory bank of the first width includes multiple second level memory banks of a second width that is smaller than the first width. Further, the memory includes a plurality of interface circuits respectively associated with the plurality of memory access circuits. Each interface circuit is configured to receive memory access requests to first level memory banks from an associated memory access circuit, segment the memory access requests into sub-requests to corresponding second level memory banks, buffer the sub-requests into buffers associated with the second level memory banks. Further, the memory includes arbitration circuitry configured to control multiplexing paths from the buffers to the second level memory banks to enable, in a same memory access clock, memory accesses from different memory access circuits to different second level memory banks within a same first level memory bank.

BRIEF DESCRIPTION OF THE DRAWINGS

Various embodiments of this disclosure that are proposed as examples will be described in detail with reference to the following figures, wherein like numerals reference like elements, and wherein:

FIG. 4 shows a table of memory access by clock cycles according to an embodiment of the disclosure;

DETAILED DESCRIPTION OF EMBODIMENTS

Figure 1:
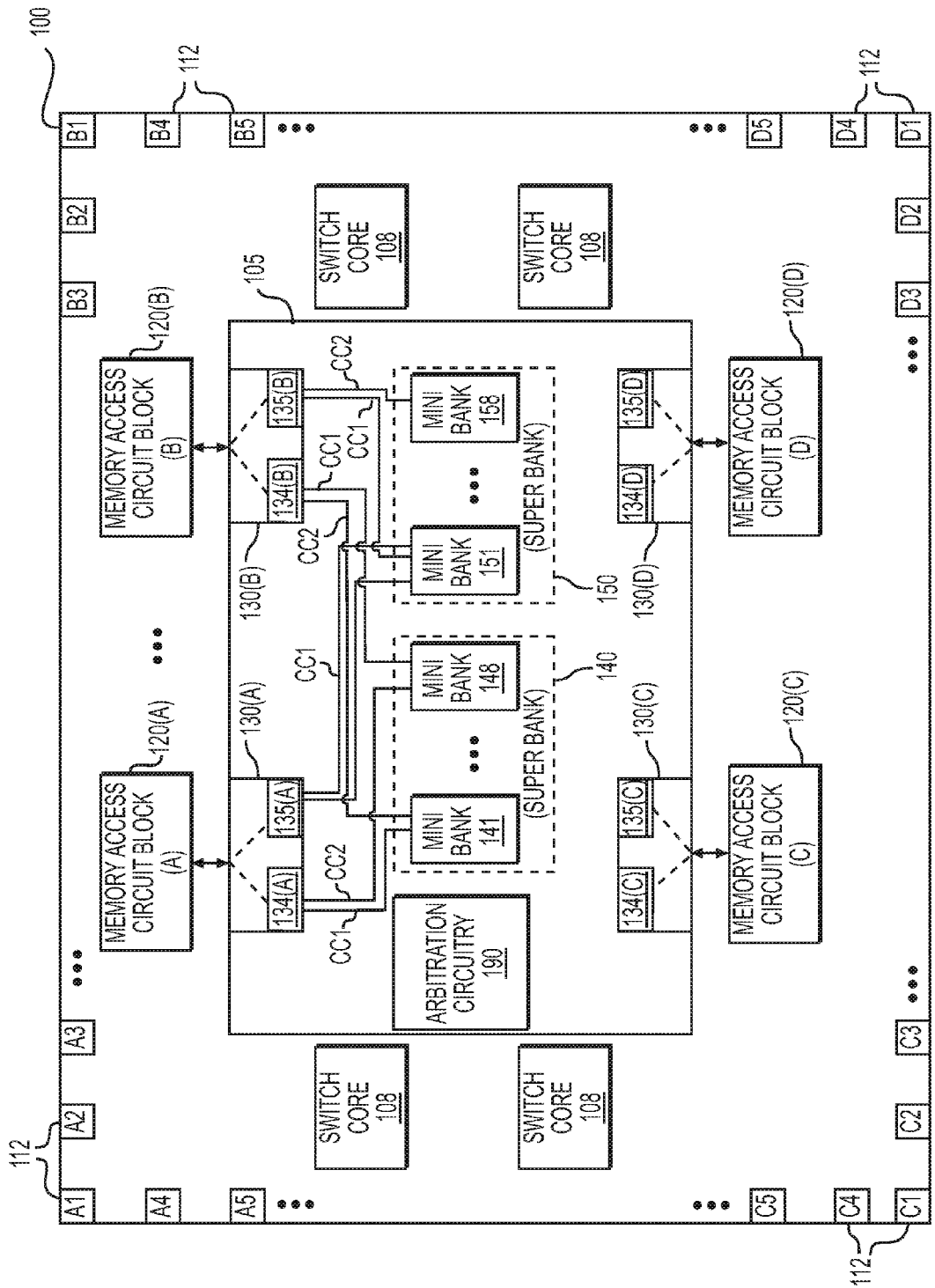
FIG. 1 shows a block diagram of a device 100 according to an embodiment of the disclosure.

FIG. 1 shows a block diagram of a device 100 according to an embodiment of the disclosure. The device 100 includes a memory 105 that is able to serve multiple access clients. The memory 105 includes a plurality of memory banks arranged in hierarchy, such as first level memory banks, second level memory banks, and the like. A higher level memory bank (e.g., a first level memory bank such as a super bank 140, 150) includes multiple lower level memory banks (e.g., second level memory banks such as mini banks 141-148, 151-158). The memory 105 is configured to control access from the multiple access clients to the memory banks by hierarchy.

The device 100 can be any suitable device that shares a memory resource among multiple access clients. In the FIG. 1 example, the device is a network switching device 100, such as a Layer-2 switch, a Layer-3 switch, and the like. The network switching device 100 includes a plurality of ports 112. In examples, a port 112 is coupled to a communication link associated with a communication network, and receives packets from the communication network and transmits packets to the communication network. Further, the network switching device 100 includes one or more switch cores 108 that are also referred to as packet processors. The switch cores 108 are configured to process packets, such as packet headers and the like, and determine operations on the packets. The memory 105 is configured to store the packets received from the plurality of ports 112 for a time period necessary for the switch cores 108 to process the packets and determine the operations on the packets.

In the FIG. 1 example, the device 100 includes a plurality of memory access circuit blocks 120(A)-(D) that are able to access the memory 105 simultaneously (e.g., in a same memory access cycle). Each of the memory access circuit blocks 120(A)-(D) is coupled to one or more ports to assist memory access by the ports. For example, the memory access circuit block 120(A) is coupled to ports A1-A5, and is configured to assist memory access by the ports A1-A5; the memory access circuit block 120(B) is coupled to ports B1-B5, and is configured to assist memory access by the ports B1-B5 the memory access circuit block 120(C) is coupled to ports C1-C5, and is configured to assist memory access by the ports C1-C5; and the memory access circuit block 120(D) is coupled to ports D1-D5, and is configured to assist memory access by the ports D1-D5.

In an example, when port A1 receives a packet, the memory access circuit block 120(A) writes the packet into the memory 105. Further, in the example, when the switch cores 108 determine that port D3 is the egress port for the packet, the memory access circuit block 120(D) reads the packet from the memory 105, and port D3 transmits the packet out of the device 100 via the communication link coupled to port D3.

In an embodiment, each of the memory access circuit blocks 120(A)-(D) includes suitable circuits to provide direct memory access (DMA) feature to allow the ports 112 to access the memory 105 independently of the switch cores 108 or other central processing unit (CPU). The memory 105 serves the memory access circuit blocks 120(A)-(D), and the memory access circuit blocks 120(A)-(D) are the memory access clients for the memory 105. To access the memory 105, in an example, the memory access circuit blocks 120(A)-(D) generate memory access requests, such as read requests, write requests, and the like.

According to an aspect of the disclosure, the memory 105 is configured to be able to serve the multiple memory access clients in an essentially simultaneous, overlapping or concurrent fashion (e.g., in a single clock cycle). The memory access circuit blocks 120(A)-(D) perform write operations to the memory 105 in response to the write requests, and perform read operations from the memory 105 in response to the read requests. In an example, the memory access circuit blocks 120(A)-(D), arc configured to have a relatively wide data path, such as 128 bytes (1024 bits) data path. Thus, in response to a write request, a data piece up to 128 bytes is written to the memory 105 and in response to a read request, a data piece up to 128 bytes is read from the memory 105, in an embodiment.

The memory 105 includes a plurality of memory banks organized in hierarchy. In the FIG. 1 example, the memory 105 includes super banks 140 and 150 as higher level memory banks and mini banks 141-148 and 151-158 as lower level memory banks. Each of the higher level memory banks aggregates one or more of the lower level memory banks respectively. For example, the super bank 140 includes the mini banks 141-148, and the super bank 150 includes the mini banks 151-158. In an example, a super bank is a logical aggregation of one or more mini banks. In another example, a super bank is at least partially a physical arrangement of one or more mini banks.

Each mini bank includes an array of memory cells and peripheral circuits, such as address decoders, sense amplifiers, control circuitry and the like. The array of memory cells can be implemented using any suitable memory technology, such as static random access memory (SRAM) technology, dynamic random access memory, and the like. It is noted that the mini banks can of a same size or different sizes.

In an embodiment, the mini banks are configured to have a bank width that is shorter than the data path of the memory access clients. In an example, the width of a super bank corresponds to a width of the data path; the width of the data path is 128 bytes and each of the mini banks has a bank width of 16 bytes, thus a write operation to a mini bank writes 16 bytes to the mini bank in a clock cycle, and a read operation from a mini bank reads back 16 bytes in a clock cycle.

According to an aspect of the disclosure, the memory 105 is configured to control access from the multiple memory access clients to the memory banks 140-148 and 150-158 by hierarchy, such that each memory access client is served by multiple super banks simultaneously (e.g., in a same memory access cycle), and each super bank serves multiple memory access clients simultaneously (e.g., in a same memory access cycle) in an embodiment.

Specifically, in the FIG. 1 example, the memory 105 includes interface circuit blocks 130(A)-130(D) respectively coupled with the memory access circuit blocks 120(A)-120(D). The interface circuit blocks 130(A)-130(D) are coupled to the memory access circuit blocks 120(A)-120(D) by data paths. In an example, the interface circuit block 130(A) is coupled to the memory access circuit block 120(A) by a data path having a width of 128 bytes; the interface circuit block 130(B) is coupled to the memory access circuit block 120(B) by a data path having a width of 128 bytes; the interface circuit block 130(C) is coupled to the memory access circuit block 120(C) by a data path having a width of 128 bytes; the interface circuit block 130(D) is coupled to the memory access circuit block 120(D) by a data path having a width of 128 bytes.

Further, each of the interface circuit blocks 130(A)-130(D) is respectively coupled to multiple super banks, such as both of the super banks 140 and 150. For example, the interface circuit block 130(A) includes an interface 134(A) coupled to the super bank 140 and an interface 135(A) coupled to the super bank 150; the interface circuit block 130(B) includes an interface 134(B) coupled to the super bank 140 and an interface 135(B) coupled to the super bank 150; the interface circuit block 130(C) includes an interface 134(C) coupled to the super bank 140 and an interface 135(C) coupled to the super bank 150; the interface circuit block 130(D) includes an interface 134(D) coupled to the super bank 140 and an interface 135(D) coupled to the super bank 150. In an embodiment, the width of each of the super banks 140-150 corresponds to the width of the data path, such as 128 bytes.

According to an aspect of the disclosure, each of the memory access circuit blocks 120(A)-(D) splits a packet read/write request into multiple data piece read/write requests. Each data piece read/write request reads/writes a data piece of the same width as the width of each of the super banks 140-150. The memory access circuit blocks 120(A)-(D) provide the data piece read/write requests to the interface circuit blocks 130(A)-(D). Each of the interface circuit blocks 130(A)-(D) splits each of the data piece read/write requests into sub-requests. Each of the sub-requests reads/writes a data unit of the same width as the width of each of the mini banks 141-148 and 151-158. Further, each of the interface circuit blocks 130(A)-130(D) uses a time-division multiplexing (TDM) arbitration to get grant a single mini bank access on each of the super bank on every memory access cycle. Thus, each of the interface circuit block 130(A)-130(D) is able to perform a full data piece read/write request in several memory access cycles (e.g., a width ratio of the super bank to the mini bank). In an example, when the width of the super banks 140-150 is 128 bytes, and the width of the mini banks 141-148 and 151-158 is 16 bytes, each of the interface circuit block 130(A)-130(D) is able to perform a full data piece read/write request in eight memory access cycles.

In an example, each of the interface circuit blocks 130(A)-130(D) includes buffers (not shown) that are respectively associated with the mini banks in the memory 105 to buffer memory access requests to the respective mini banks. In an example, the interfaces 134(A)-(D) are respectively coupled to the super bank 140 and the interfaces 135(A)-(D) are respectively coupled to the super bank 150. Further, in each super bank, mini banks are selectively coupled to the interfaces. For example, in the super bank 140, the mini banks 141-148 are selectively coupled to the interfaces 134(A)-(D), and the in the super bank 150, the mini bank 151-158 are selectively coupled to the interfaces 135(A)-(D).

For example, in a first clock cycle (CC1), the interface 134(A) is coupled to the mini bank 141 in the super bank 140, the interface 134(B) is coupled to the mini bank 148 in the super bank 140, the interface 135(A) is coupled to the mini bank 158 in the super bank 150 and the interface 135(B) is coupled to the mini bank 151 in the super bank 150; and in a second clock cycle (CC2), the interface 134(A) is coupled to the mini bank 148 in the super bank 140, the interface 134(B) is coupled to the mini bank 141 in the super bank 140, the interface 135(A) is coupled to the mini bank 151 in the super bank 150, and the interface 135(B) is coupled to the mini bank 158 in the super bank 150. Thus, in a clock cycle, each interface circuit block (or memory access client) is able to access mini banks in multiple super banks; and in a clock cycle, a super bank is able to serve different interface circuit blocks (different memory access clients) at the same time.

In the example, in subsequent memory cycles, each of the memory access circuits is configured to access different mini banks of the same super bank using different sub-requests of the same access request. In this manner, corresponding lines in mini banks of the same super bank are accessed in the subsequent memory cycles, with a complete memory access request being performed by multiple sub-requests over multiple subsequent cycles.

Further, according to an aspect of the disclosure, the memory 105 includes arbitration circuitry 190 to control paths from the interface circuit blocks 130(A)-130(D) to the super banks and the mini banks in hierarchy to achieve various benefits, such as load balance, higher efficiency, lower latency jitter, simply implementation, and the like. In an example, the memory 105 includes a plurality of multiplexers to form the paths from the interface circuit blocks 130(A)-130(D) to the super banks and the mini banks, and the arbitration circuitry 190 provides select signals to the multiplexers to control the paths.

In an example, the arbitration circuitry 190 is configured to control the interface circuit blocks 130(A)-130(D) to conduct write operations simultaneously in a memory access cycle to different mini banks of the same super bank, and is configured to control the interface circuit blocks 130(A)-130(D) to conduct read operations simultaneously in a memory access cycle to different mini banks of the same super bank. The arbitration circuitry 190 is configured to arbitrate the write operations or read operations according to time-division multiplexing. In an example, the arbitration circuitry 190 is configured to arbitrate write operations in 50% of the memory access cycles and arbitrate read operations in 50% of the memory access cycles. It is noted that the arbitration circuitry 190 is configured to use other suitable time divisions for the write operations and the read operations.

According to an aspect of the disclosure, the memory access circuit blocks 120(A)-(D) is configured to use suitable algorithm to generate write requests to the memory 105 to perform load balancing across the super banks. The arbitration circuitry 190 is configured control the memory access in hierarchy to allow one super bank to serve multiple memory access clients simultaneously in a single memory access cycle, such that each of the different memory access clients simultaneously accesses a different mini bank of the same super bank in the same memory access cycle. Further, the arbitration circuitry 190 is configured to allow one memory client to access different mini banks in the same super bank in multiple memory access cycles to perform a memory access to the super bank. In an example, the arbitration circuitry 190 is configured to allow one memory client to sequentially access eight mini banks in a super bank in subsequent eight memory access cycles to perform a full memory access to the super bank.

In an embodiment, the arbitration circuitry 190 additionally is configured to allow one memory access client to access multiple mini banks of a single super bank to perform a particular memory access operation piece by piece over the course of two or more consecutive memory access cycles.

It is noted that the device 100 can be implemented using any suitable technology. In an example, the device 100 is implemented on an integrated circuit (IC) chip using application-specific integrated circuit (ASIC) technology. In another example, the device 100 is implemented using multiple IC chips.

Figure 2:
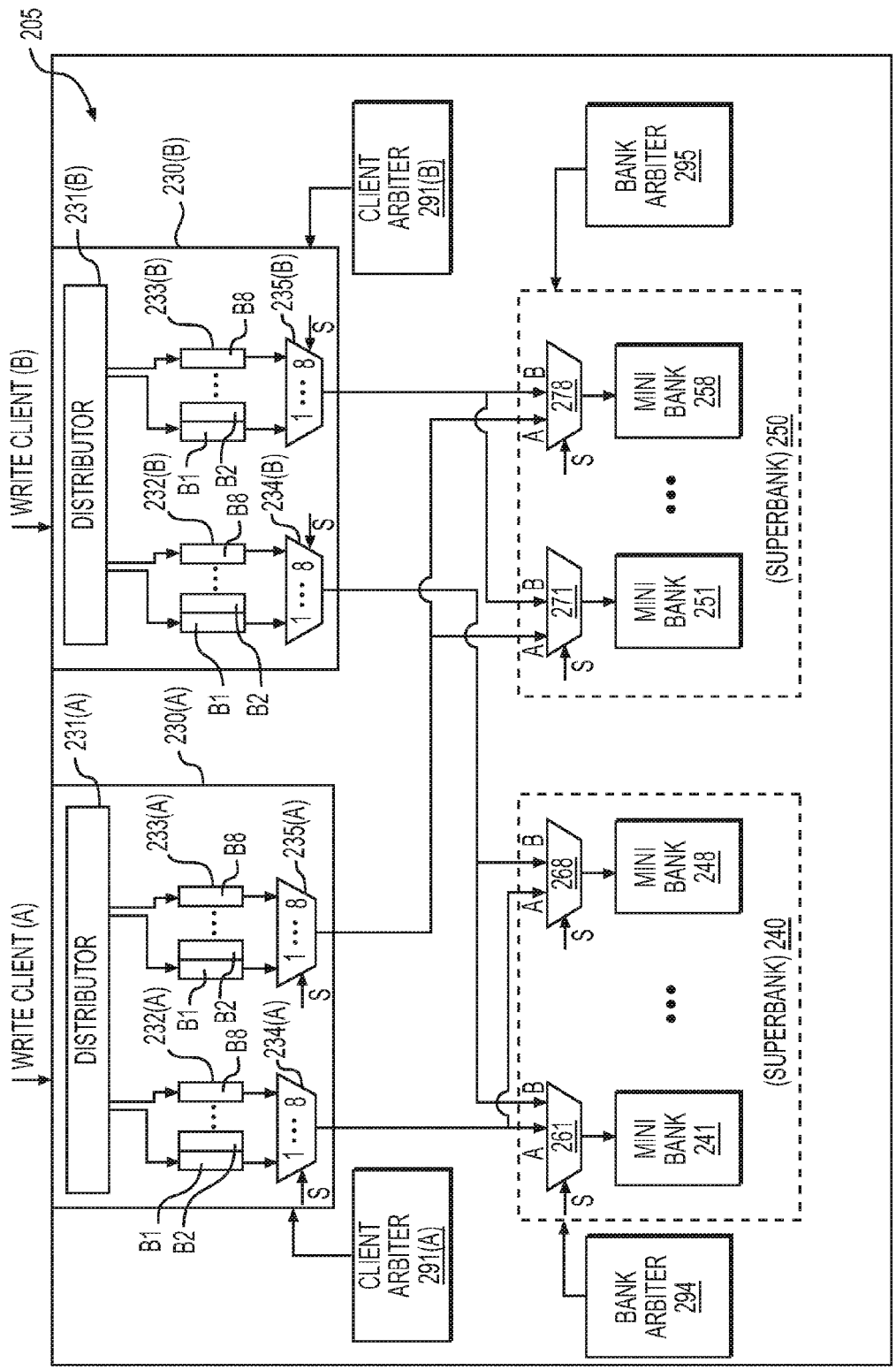
FIG. 2 shows a block diagram of a memory 205 during a write operation according to an embodiment of the disclosure.

FIG. 2 shows a block diagram of a memory 205 during a write operation according to an embodiment of the disclosure. In an example, the memory 105 in FIG. 1 is implemented according to the memory 205 for write operations. The memory 205 operates similarly to the memory 105 described above. The memory 205 also utilizes certain components that are identical or equivalent to those used in the memory 105; the description of these components has been provided above and will be omitted here for clarity purposes.

In the FIG. 2 example, the memory 205 includes a first super bank 240 and a second super bank 250. The first super bank 240 includes eight mini banks 241-248, and the second super bank 250 includes eight mini banks 251-258. The interface circuit blocks 230(A)-230(B) include a distributor circuits, buffers and interfaces to memory banks.

Specifically, the interface circuit block 230(A) includes a distributor 231(A), a first group of buffers 232(A) and a second group of buffers 233(A), a first multiplexer 234(A) and a second multiplexer 235(A) coupled together as shown in FIG. 2. The first group of buffers 232(A) includes eight buffers respectively corresponding to the mini banks 241-248 in the first super bank 240; and the second group of buffers 233(A) includes eight buffers respectively corresponding to the mini banks 251-258 in the second super bank 250. The first group of buffers 232(A) are coupled to the first multiplexer 234(A) and the second group of buffers 233(A) are coupled to the second multiplexer 235(A). The output of the first multiplexer 234(A) is coupled to the mini banks 241-248 in the first super bank 240, and the output of the second multiplexer 235(A) is coupled to the mini banks 251-258 in the second super bank 250.

According to an aspect of the disclosure, the distributor 231(A) is configured to receive a write request, such as a data piece of a first width (e.g., 128 bytes), from a write client. The distributor 231(A) segments the write request into eight sub-requests, such as eight sub-units of a second width (e.g., 16 bytes), and distributes the segmented sub-requests (e.g., sub-units) into the first group of buffers 232(A) or the second group of buffers 233(A).

In an example, the first group of buffers 232(A) and the second group of buffers 233(A) are first-in-first-out (FIFO) buffers. The first multiplexer 234(A) selects one of the first group of buffers 232(A) to output a sub-request (sub-unit), and the second multiplexer 235(A) selects one of the second group of buffers 233(A) to output a sub-request (sub-unit). The first multiplexer 234(A) is configured to output a sub-request (sub-unit) to any of the mini banks 241-248 in the first super bank 240 and the second multiplexer 235(A) is configured to output a sub-request (sub-unit) to any of the mini banks 251-258 in the second super bank 250.

The interface circuit block 230(B) is similarly configured as the interface circuit block 230(A) and utilizes certain components that are identical or equivalent to those used in the interface circuit block 230(A); the description of these components has been provided above and will be omitted here for clarity purposes.

In the FIG. 2 example, each of the mini banks 241-248 and 251-258 is coupled to a multiplexer to select one of the interface circuit blocks 230(A)-230(B), in other words one of the write clients. For example, the mini bank 241 is coupled to a multiplexer 261. The multiplexer 261 is configured to select one of the interface circuit blocks 230(A)-230(B) to provide a sub-request (sub-unit) the mini bank 241.

The memory 205 includes arbitration circuitry to control paths from the interface circuit blocks 230(A)-230(B) to the super banks and the mini banks in hierarchy to achieve various benefits, such as load balance, higher efficiency, lower latency jitter, simply implementation, and the like. Specifically, the memory 205 includes a first client arbiter 291(A), a second client arbiter 291(B), a first bank arbiter 294, and a second bank arbiter 295. The first client arbiter 291(A) is coupled to the multiplexers 234(A)-235(A) in the interface circuit block 230(A). The second client arbiter 291(B) is coupled to the multiplexers 234(B)-235(B) in the interface circuit block 230(B). The first bank arbiter 294 is coupled to the multiplexers 261-268 of the first super bank 240. The second bank arbiter 295 is coupled to the multiplexers 271-278 of the second super bank 250.

According to an aspect of the disclosure, the first client arbiter 291(A), the second client arbiter 291(B), the first bank arbiter 294, and the second bank arbiter 295 are configured to control the multiplexers in a time-division multiplexing (TDM) manner to multiplex paths from the interface circuit blocks 230(A)-230(B) to the memory banks in hierarchy. For example, the first client arbiter 291(A) and the first bank arbiter 294 are configured to allow the write client (A) to respectively write 16 bytes to each of the mini banks 241-248 in the super bank 240 in eight memory access cycles in order to write 128 bytes to the super bank 240.

It is noted that, in FIG. 2, two interface circuit blocks and two super banks are used as an example. The memory 205 is configured to include any suitable number of interface circuit blocks and any suitable number of super banks. The operations of the components in the memory 205 will be described in more detail with reference to the FIG. 3 and FIG. 4.

In the FIG. 2 example, a super bank includes eight mini banks. In other examples, a super bank is configured to include other suitable number of mini banks.

Figure 3:
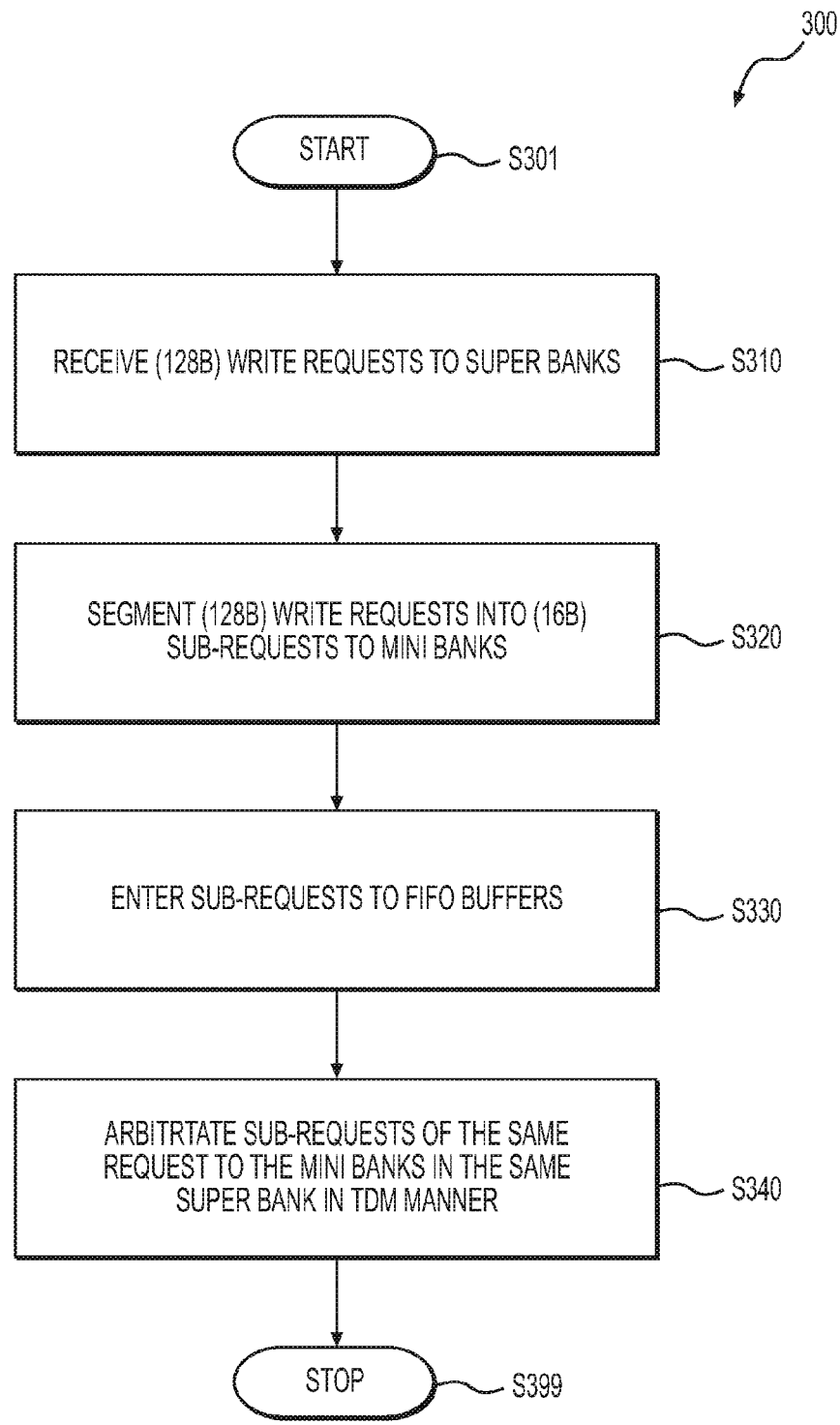
FIG. 3 shows a flow chart outlining a process 300 for write operations according to an embodiment of the disclosure.

FIG. 3 shows a flow chart outlining a process 300 for a write operation according to an embodiment of the disclosure. In an example, the process 300 is executed in the memory 205. The process starts at S301 and proceeds to S310.

At S310, write requests to super banks are received. For example, the interface circuit block 230(A) receives data pieces of 128 bytes to write to super banks 240-250 from a memory access client (e.g., 120(A)) that is coupled to a plurality of ports (e.g., A1-A5); and the interface circuit block 230(B) receives data pieces of 128 bytes to write to super banks 240-250 from a memory access client (e.g., 120(B)) that is coupled to a plurality of ports (e.g., B1-B5).

At S320, write requests are segmented into sub-requests to mini banks. For example, the distributor 231(A) segments each data piece of 128 bytes into 8 sub-units of 16 bytes. The distributor 231(B) segments each data piece of 128 bytes into 8 sub-units of 16 bytes.

At S330, sub-requests are distributed into buffers. For example, the distributor 231(A) distributes 8 sub-units of a data piece to be written to the super bank 240 respectively to the buffers 232(A), and distributes 8 sub-units of a data piece to be written to the super bank 250 respectively to the buffer 233(A); the distributor 231(B) distributes 8 sub-units of a data piece to be written to the super bank 240 respectively to the buffers 232(B), and distributes 8 sub-units of a data piece to be written to the super bank 250 respectively to the buffer 233(B).

At S340, sub-units are written to mini banks under the arbitration. For example, the first client arbiter 291(A), the second client arbiter 291(B), the first bank arbiter 294, and the second bank arbiter 295 provide select signals to the multiplexers in a TDM manner to store the buffered sub-units to the mini banks. In an example, sub-requests of the same request are arbitrated in different memory access cycles to access corresponding mini banks in the same super bank. A detail example is shown in FIG. 4. Then the process proceeds to S399 and terminates.

FIG. 4 shows a table of memory access of a write operation by clock cycles according to an embodiment of the disclosure. In the example, each clock cycle corresponds to a memory access cycle.

In a first clock cycle, the client arbiter 291(A) provides a select signal (e.g., of "1") to the multiplexer 234(A) to select the buffer B1 in the group of buffers 232(A) and a select signal (e.g., of "1") to the multiplexer 235(A) to select the buffer B1 in the group of buffers 233(A). The client arbiter 291(B) provides a select signal (e.g., of "2") to the multiplexer 234(B) to select the buffer B2 in the group of buffers 232(B) and a select signal (e.g., of "2") to the multiplexer 235(B) to select the buffer B2 in the group of buffers 233(B). The bank arbiter 294 provides a select signal (e.g., of "1") the multiplexer 261 to select the interface circuit block 230(A) to couple to the mini bank 241 and provides a select signal (e.g., of "2") to the multiplexer 262 to select the interface circuit block 230(B) to couple to the mini bank 242. The bank arbiter 295 provides a select signal (e.g., of "1") to the multiplexer 271 to select the interface circuit block 230(A) to couple to the mini bank 251 and provides a select signal (e.g., of "2") to the multiplexer 272 to select the interface circuit block 230(B) to couple to the mini bank 252.

In the first clock cycle, the memory 205 forms a path from the buffer B1 in the group of buffers 232(A) to the mini bank 241; a path from the buffer B1 in the group of buffers 233(A) to the mini bank 251; a path from the buffer B2 in the group of buffers 232(B) to the mini bank 242; and a path from the buffer B2 in the group of buffers 233(B) to the mini bank 252.

In a second clock cycle, the client arbiter 291(A) provides a select signal (e.g., of "2") to the multiplexer 234(A) to select the buffer B2 in the group of buffers 232(A) and a select signal (e.g., of "2") to the multiplexer 235(A) to select the buffer B2 in the group of buffers 233(A). The client arbiter 291(B) provides a select signal (e.g., of "3") to the multiplexer 234(B) to select the buffer B3 in the group of buffers 232(B) and a select signal (e.g., of "3") to the multiplexer 235(B) to select the buffer B3 in the group of buffers 233(B). The bank arbiter 294 provides a select signal (e.g., of "1") the multiplexer 262 to select the interface circuit block 230(A) to couple to the mini bank 242 and provides a select signal (e.g., of "2") to the multiplexer 263 to select the interface circuit block 230(B) to couple to the mini bank 243. The bank arbiter 295 provides a select signal (e.g., of "1") to the multiplexer 272 to select the interface circuit block 230(A) to couple to the mini bank 252 and provides a select signal (e.g., of "2") to the multiplexer 273 to select the interface circuit block 230(B) to couple to the mini bank 253.

In the second clock cycle, the memory 205 forms a path from the buffer B2 in the group of buffers 232(A) to the mini bank 242; a path from the buffer B2 in the group of buffers 233(A) to the mini bank 252; a path from the buffer B3 in the group of buffers 232(B) to the mini bank 243; and a path from the buffer B3 in the group of buffers 233(B) to the mini bank 253.

So on so forth, as shown in FIG. 4, in eight clock cycles, the interface circuit block 230(A) and the interface circuit block 230(B) simultaneously (e.g., in the same memory access cycles) write to the super bank 240 and the super bank 250. A mini bank is configured to serve an interface circuit block (corresponding to a memory access client) in a clock cycle, and is configured to serve different interface circuit blocks (corresponding to different memory access clients) at different clock cycles. Each interface circuit block (corresponding to a memory access client) is configured to write to multiple the super banks in a clock cycle. One super bank is configured to serve multiple memory access clients in a clock cycle.

In the FIG. 4 example, the interface circuit block 230(A) sequentially accesses the mini banks 241-248 in eight different clock cycles to perform a memory access to the super bank 240; the interface circuit block 230(A) also sequentially access mini banks 251-258 in the eight different clock cycles to perform a memory access to the super bank 250. At the same time, the interface circuit block 230(B) sequentially accesses the mini banks 242-248 then 241 in the eight different clock cycles to perform a memory access to the super bank 240; the interface circuit block 230(B) also sequentially accesses the mini banks 252-258 then 251 in the eight different clock cycles to perform a memory access to the super bank 250.

It is noted that the sequence of writing to the super banks and mini banks in FIG. 4 is for illustration, the sequence can be suitably modified without departing from the scope of the disclosure.

Figure 5A:
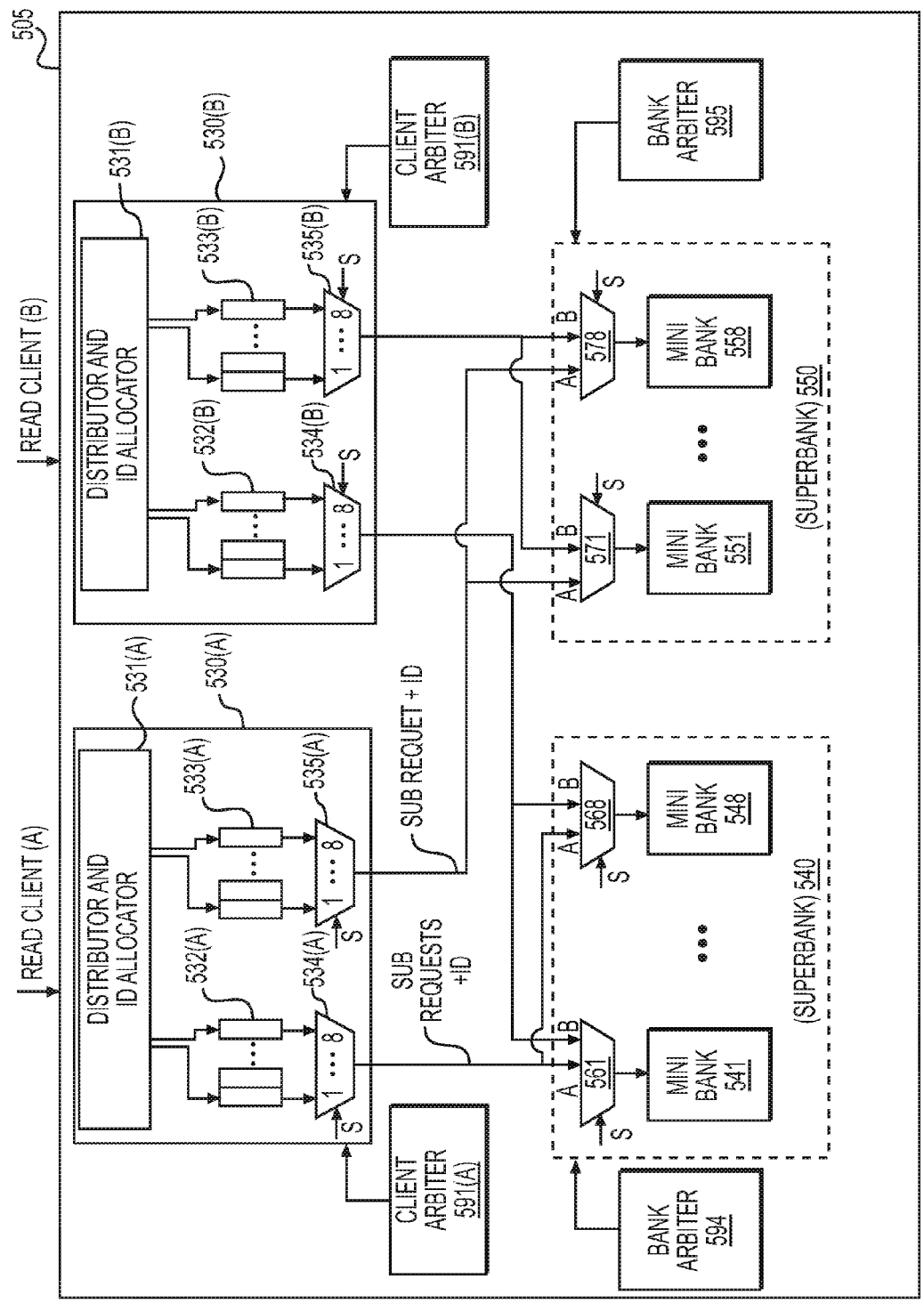
FIGS. 5A and 5B show block diagrams of a memory 505 during a read operation according to an embodiment of the disclosure.
Figure 5B:
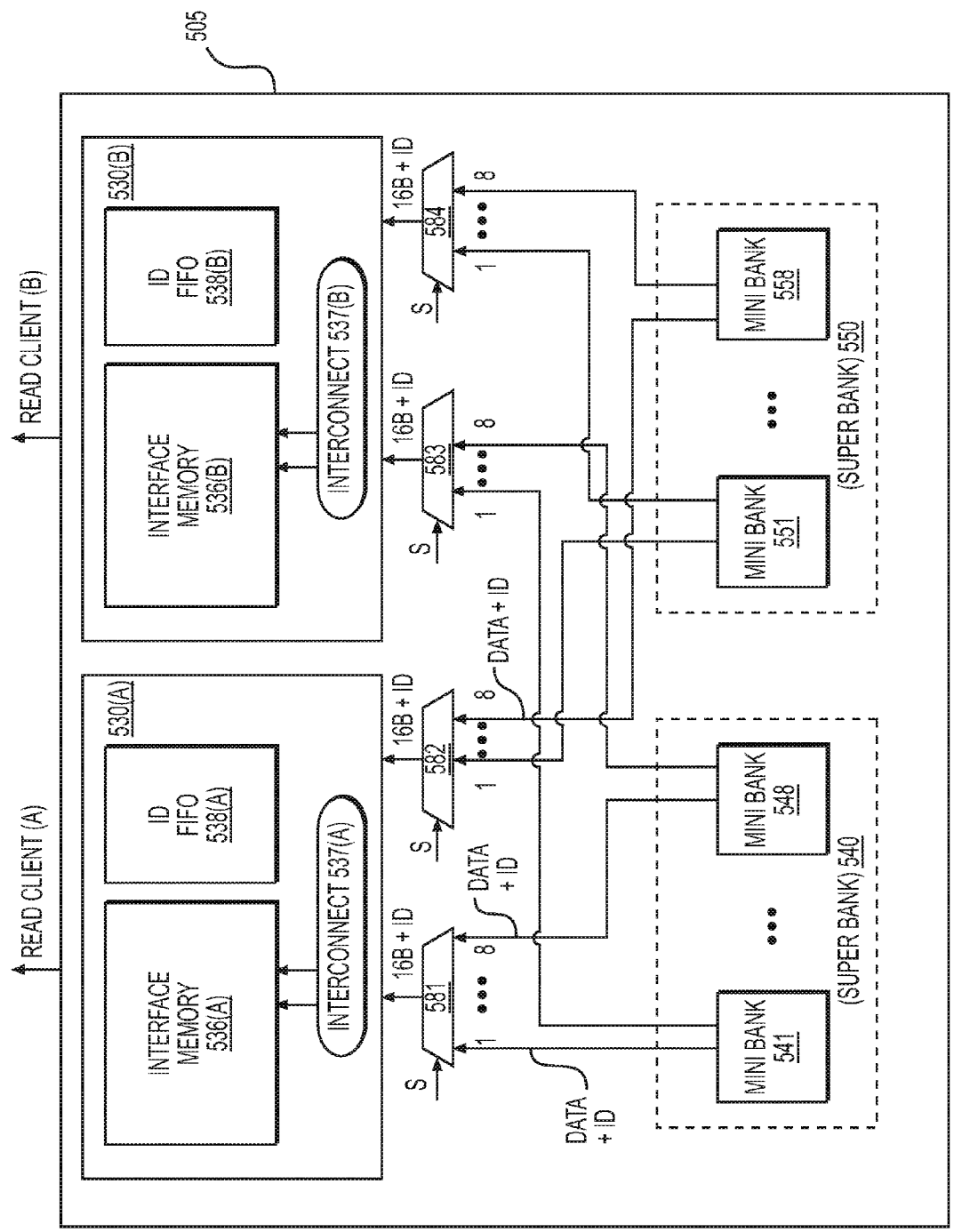

FIGS. 5A and 5B show block diagrams of a memory 505 during read operations according to an embodiment of the disclosure. In an example, the memory 105 in FIG. 1 is implemented according to the memory 505 for read operations. The memory 505 operates similarly to the memory 105 described above. The memory 505 also utilizes certain components that are identical or equivalent to those used in the memory 105; the description of these components has been provided above and will be omitted here for clarity purposes.

Read operations send read requests to memory banks, and then receive read replies with data back from the memory banks. FIG. 5A shows the memory 505 when read requests are sent to the memory banks and the FIG. 5B shows the memory 505 when read reply with data return back from the memory banks.

In FIG. 5A, the memory 505 operates similarly to the memory 205 during write operations described above. The memory 505 also utilizes certain components that are identical or equivalent to those used in the memory 205; the description of these components has been provided above and will be omitted here for clarity purposes.

In FIG. 5A, the distributor 531(A) receives a read request for a data piece of a first width (e.g., 128 bytes) from a read client, segments the read request into eight sub-requests for sub-units of a second width (e.g., 16 bytes), assigns identifications (IDs) for re-ordering to the sub-requests and distribute the segmented sub-requests with the assigned IDs into the first group of buffers 532(A) or the second group of buffers 533(A). The first group of buffers 532(A) respectively correspond to the mini banks 541-548 in the super bank 540. The second group of buffers 533(A) respectively correspond to the mini banks 551-558 in the super bank 550.

In an example, the first group of buffers 532(A) and the second group of buffers 533(A) are first-in-first-out (FIFO) buffers configured to buffer the sub-requests with IDs. The first multiplexer 534(A) selects one of the first group of buffers 532(A) to output a sub-request with an ID, and the second multiplexer 535(A) selects one of the second group of buffers 533(A) to output a sub-request with an ID. The output of the first multiplexer 534(A) is coupled to the mini banks 541-548 in the first super bank 540 and the output of the second multiplexer 535(A) is coupled to the mini banks 551-558 in the second super bank 550.

The client arbiters 591(A)-591(B) operate similarly to the client arbiter 291(A)-291(B) and the bank arbiters 594-595 operate similarly to the bank arbiters 294-295 to control paths for sending read sub-requests with IDs to the mini banks in the super banks 540 and 550. For example, the first client arbiter 591(A) and the first bank arbiter 594 are configured to allow the read client (A) to respectively read 16 bytes from each of the mini banks 541-548 in the super bank 540 in eight memory access cycles in order to read 128 bytes from the super bank 540. The description of these components has been provided above and will be omitted here for clarity purposes.

According to an aspect of the disclosure, when a mini bank, such as any of the mini banks 541-548 and 551-558, receives a read sub-request with an ID, the mini bank returns a sub-unit (e.g., 16 bytes) with the ID in response to the read sub-request with the ID.

The FIG. 5B shows the memory 505 when data is read back from the memory banks. Specifically, the memory 505 includes multiplexers 581-584 to selectively form paths to carry data from the memory banks to the interface circuit blocks 530(A)-530(B). For example, the multiplexer 581 selects one of the mini banks 541-548 to output a sub-unit with an ID to the interface circuit block 530(A), the multiplexer 582 selects one of the mini banks 551-558 to output a sub-unit with an ID to the interface circuit block 530(A); the multiplexer 583 selects one of the mini banks 541-548 to output a sub-unit with an ID to the interface circuit block 530(B), the multiplexer 584 selects one of the mini banks 551-558 to output a sub-unit with an ID to the interface circuit block 530(B).

In an example, the client arbiter 591(A) is configured to provide to the multiplexer 581 a select signal similar to the one provided to the multiplexer 534(A), and provide to the multiplexer 582 a select signal similar to the one provided to the multiplexer 535(A); the client arbiter 591(B) is configured to provide to the multiplexer 583 a select signal similar to the one provided to the multiplexer 534(B), and provide to the multiplexer 584 a select signal similar to the one provided to the multiplexer 535(B).

Further, in the FIG. 5B example, the interface circuit block 530(A) includes an interconnect circuit 537(A), an interface memory 536(A) and an ID buffer 538(A). The interconnect circuit 537(A) is configured to receive the sub-units with IDs, the interface memory 536(A) and the ID buffer 538(A) are configured to re-order and assemble the sub-units (e.g., 16 bytes each) into data pieces (e.g., 128 bytes each). In an example, when the interconnect circuit 537(A) receives a sub-unit with an ID, the sub-unit is stored in the interface memory 536(A) according to the ID, and then is assembled with other sub-units to form a data piece.

For example, when the interface circuit block 530(A) assigns IDs to sub-requests for reading a data piece (e.g., 128 bytes), memory spaces (8 of 16 bytes) in the interface memory 536(A) are allocated to those IDs. When sub-units with those IDs are returned, the sub-units are stored in the memory spaces according to the IDs. When the memory spaces are filled with the sub-units according to the IDs, the sub-units are assembled to form a data piece, and the data piece is returned to the read client.

The interface circuit block 530(B) operates similarly as the interface circuit block 530(A). The interface circuit block 530(B) also utilizes certain components that are identical or equivalent to those used in the interface circuit block 530(A). The description of these components has been provided above and will be omitted here for clarity purposes.

According to the disclosure, the interface circuit block 530(A) and the interface circuit block 530(B) simultaneously (e.g., in a same memory access cycle) read from the super bank 540 and the super bank 550. A mini bank is configured to serve an interface circuit block (corresponding to a memory access client) in a clock cycle, and is configured to serve different interface circuit blocks (corresponding to different memory access clients) at different clock cycles. Each interface circuit block (corresponding to a memory access client) is configured to read from multiple the super banks in a clock cycle, and a super bank is configured to serve multiple interface circuit blocks (corresponding to multiple read clients) in a clock cycle.

Figure 6:
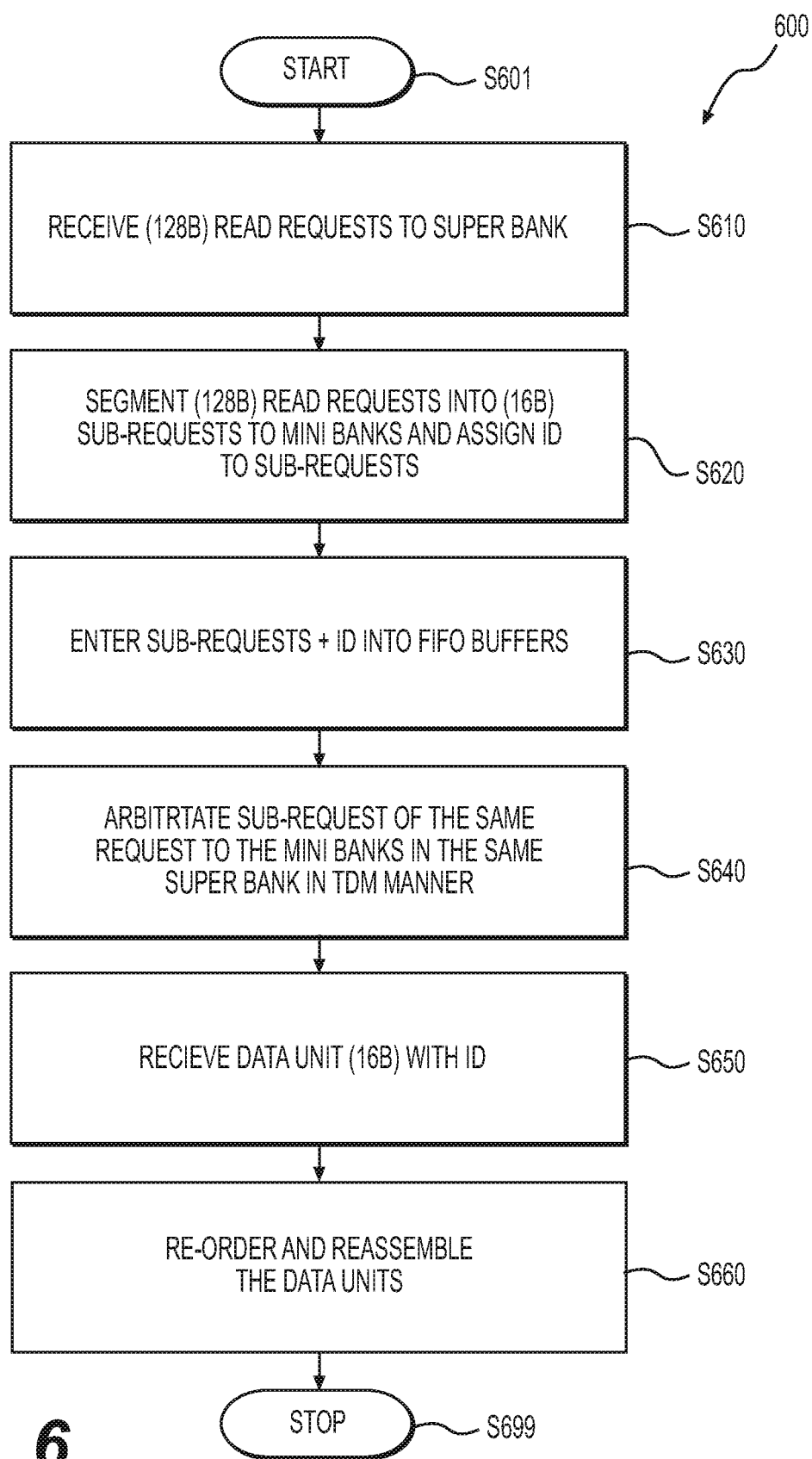
FIG. 6 shows a flow chart outlining a process 600 for read operations according to an embodiment of the disclosure.

FIG. 6 shows a flow chart outlining a process 600 for a read operation according to an embodiment of the disclosure. In an example, the process 600 is executed in the memory 505. The process starts at S601 and proceeds to S610.

At S610, write requests to super banks are received. For example, the interface circuit block 530(A) receives read requests from a memory access client (e.g., 120(A)) for data pieces (e.g., each of 128 bytes) from the super banks 540-550; and the interface circuit block 530(B) receives read requests from a memory access client (e.g., 120(B)) for data pieces (e.g., each of 128 bytes) from the super banks 540-550.

At S620, read requests are segmented into sub-requests for sub-units from mini banks. For example, the distributor 531(A) segments each read request of a data piece of 128 bytes into 8 sub-requests for sub-units of 16 bytes each, assigns different IDs to the sub-requests, and allocates memory spaces corresponding to the assigned IDs in the interface memory 536(A). The distributor 531(B) segments each read request of a data piece of 128 bytes into 8 sub-requests for sub-units of 16 bytes each, assigns different IDs to the sub-requests, and allocates memory spaces corresponding to the assigned IDs in the interface memory 536(B).

At S630, sub-requests with IDs are distributed into buffers. For example, the distributor 531(A) distributes 8 sub-requests with IDs for reading a data piece in the super bank 540 respectively to the buffers 532(A), and distributes 8 sub-requests with IDs for reading a data piece in the super bank 550 respectively to the buffers 533(A); the distributor 531(B) distributes 8 sub-requests with IDs for reading a data piece in the super bank 540 respectively to the buffers 532(B), and distributes 8 sub-requests with IDs for reading a data piece in the super bank 550 respectively to the buffers 533(B).

At S640, sub-requests with IDs are directed to mini banks under the arbitration. For example, the first client arbiter 591(A), the second client arbiter 591(B), the first bank arbiter 594, and the second bank arbiter 595 provide select signals to the multiplexers in a TDM manner to form paths to direct the sub-requests with IDs to the mini banks. In an example, sub-requests of the same request are arbitrated in different memory access cycles to access corresponding mini banks in the same super bank. Sub-units with the IDs are output from the mini banks in response to sub-requests with IDs.

At S650, sub-units with IDs are received at the interface circuit blocks. For example, the client arbiter 591(A) and the client arbiter 591(B) provide select signals to the multiplexers 581-584 to form reply paths to direct the sub-units with IDs from the mini banks to the interface circuit blocks 530(A)-(B).

At S660, sub-units are re-ordered and reassembled into data pieces. For example, when the interconnect circuit 537(A) receives sub-units with IDs, the sub-units are stored in the memory spaces allocated to the IDs in the interface memory 536(A). When memory spaces for a data piece are filled with the sub-units according to the IDs, the sub-units are assembled to form the data piece, and the data piece is returned to the read client. Then the process proceeds to S699 and terminates.

When implemented in hardware, in an example, the hardware comprises one or more of discrete components, an integrated circuit, an application-specific integrated circuit (ASIC), etc.

While aspects of the present disclosure have been described in conjunction with the specific embodiments thereof that are proposed as examples, alternatives, modifications, and variations to the examples may be made. Accordingly, embodiments as set forth herein are intended to be illustrative and not limiting. There are changes that may be made without departing from the scope of the claims set forth below.

What is claimed is:

1. A circuit, comprising:
a plurality of memory access circuits configured to access a memory to read or write data of a first width, wherein the memory comprises a plurality of memory banks that are organized in hierarchy, a first level memory bank of the first width includes multiple second level memory banks of a second width that is smaller than the first width;
a plurality of interface circuits respectively associated with the plurality of memory access circuits, wherein ones of the interface circuits are configured to receive memory access requests to first level memory banks from an associated memory access circuit, segment the memory access requests into sub-requests to corresponding second level memory banks, buffer the sub-requests into buffers associated with the second level memory banks; and
arbitration circuitry configured to control multiplexing paths from the buffers to the second level memory banks to enable, in a same memory access cycle, memory accesses based on respective sub-requests from different memory access circuits to different second level memory banks within a same first level memory bank and further configured to control multiplexers to select a buffer from a group of buffers according to time-division-multiplexing (TDM) to cause different sub-requests of a same request to access different second level memory banks of the same first level memory bank in different memory access cycles.

2. The circuit of claim 1, wherein the arbitration circuitry is configured to control the multiplexing paths to enable, in a same memory access cycle, memory accesses from one of the memory access circuits to two or more second level memory banks that are respectively in different first level memory banks.

3. The circuit of claim 1, wherein a memory access circuit is associated with a plurality of ports for receiving/transmitting packets, and is configured to generate memory access requests in response to operations of the plurality of ports.

4. The circuit of claim 1, wherein ones of the interface circuits respectively include a distributor circuit configured to segment a memory access request into sub-requests and distribute the sub-quests to the buffers associated with the second level memory banks.

5. The circuit of claim 4, wherein the interface circuit includes an identification allocator configured to assign identifications to sub-requests segmented from a read request to read a data piece of the first width from the memory.

6. The circuit of claim 5, wherein a second level memory bank is configured to receive a sub-request with an identification and return a data unit with the identification in response to the sub-request.

7. The circuit of claim 5, wherein the interface circuit is configured to receive data units with identifications, re-order the data units according to the identifications and assemble the data units into a data piece.

8. The circuit of claim 6, wherein the interface circuit comprises:
an interface memory with memory spaces allocated according to the identifications to store the data units into the memory spaces allocated according to the identifications to re-order the data units and assemble the data units.

9. The circuit of claim 1, wherein each interface circuit includes first multiplexers respectively corresponding to the first level memory banks, a first multiplexer corresponding to a first level memory bank is configured to select a buffer from a group of buffers that buffer sub-requests for a memory access request to the first level memory bank, and direct a sub-request from the selected buffer to the first level memory bank.

10. The circuit of claim 9, further comprising:
second multiplexers respectively associated with second level memory banks, a second multiplexer associated with a second level memory bank in a first level memory bank is configured to select one of the interface circuits to provide a sub-request to the second level memory bank.

11. The circuit of claim 9, wherein the arbitration circuitry is configured to control each of the first multiplexers to select a buffer from a group of buffers according to time-division-multiplexing (TDM) to cause different sub-requests of a same request to access different second level memory banks of a same first level memory bank in different memory access cycles.

12. The circuit of claim 10, wherein the arbitration circuitry is configured to control each of the second multiplexers to select one of the interface circuit according to the time-division-multiplexing (TDM) to cause different interface circuits to access the second level memory banks at different memory access cycles.

13. The circuit of claim 1, wherein the arbitration circuitry is configured, in different memory access cycles, to cause different sub-requests of the same request to access different second level memory banks of the same first level memory bank.

14. A method for using a memory, comprising:
receiving memory access requests from a plurality of memory access clients to a memory, wherein the memory comprises a plurality of memory banks that are organized in hierarchy, a first level memory bank of a first width includes multiple second level memory banks of a second width that is smaller than the first width, and a memory access request writes/reads a data piece of the first width to/from one of the first level memory banks;
segmenting first memory access requests from a first memory access client into first sub-requests to the second level memory banks;
segmenting second memory access quests from a second memory access client into second sub-requests to the second level memory banks;
buffering first sub-requests into first buffers associated with the second level memory banks;
buffering second sub-requests into second buffers associated with the second level memory banks; and
controlling multiplexing paths from the first buffers and the second buffers to the second level memory banks to enable, in a same memory access cycle, memory accesses based on respective sub-requests from first memory access client and the second memory access client to different second level memory banks within a same first level memory bank by controlling multiplexers to select a buffer from a group of buffers according to time-division-multiplexing (TDM) to cause different sub-requests of a same request to access different second level memory banks of the same first level memory bank in different memory access cycles.

15. The method of claim 14, further comprising:
controlling the multiplexing paths to enable, in a same memory access cycle, memory accesses from one memory access client to multiple second level memory banks that are respectively in different first level memory banks.

16. The method of claim 14, further comprising:
assigning identifications to sub-requests segmented from a read request to read a data piece of the first width from the memory.

17. The method of claim 16, further comprising:
receiving a sub-request with an identification by a second level memory bank; and
returning, by the second level memory bank, a data unit with the identification in response to the sub-request.

18. The method of claim 16, further comprising:
receiving data units with identifications;
re-ordering the data units according to the identifications; and
assembling the data units into a data piece.

19. The method of claim 14, further comprising:
controlling the multiplexing paths to select a buffer from a group of buffers corresponding to second level memory banks in a same first level memory bank according to time-division-multiplexing (TDM) to cause different sub-requests of a same request to access different second level memory banks of a same first level memory bank in different memory cycles.

20. The method of claim 14, further comprising:
controlling multiplexing paths to select the memory access clients to access a second level memory bank according to the time-division-multiplexing (TDM) to cause different memory access clients to access the second level memory banks at different memory access cycles.

21. The method of claim 14, further comprising:
controlling the multiplexing paths to select different buffers from the group of buffers in different memory access cycles to cause different sub-requests of the same request to access different second level memory banks of the same first level memory bank.

22. A network device, comprising:
a plurality of ingress ports configured to receive data packets from one or more network devices on a network;
one or more packet processors configured process received data packets to make a forwarding decision for received data packets;
a plurality of egress ports configured to output the data packets to the one or more network devices on the network based on the forwarding decision;
memory configured to buffer the received data packets, during processing of the data packets at the one or more packet processors, the memory including a plurality of separately addressable memory banks;
a plurality of memory access circuits coupled to the ingress ports and the egress ports to buffer the received data packets from the ingress ports to the memory and provide the buffered data packets from the memory to the egress ports, the memory access circuits accessing the memory to read or write data of a first width;

the memory comprising:
- a plurality of memory banks that are organized in hierarchy, wherein a first level memory bank of the first width includes multiple second level memory banks of a second width that is smaller than the first width;
- a plurality of interface circuits respectively associated with the plurality of memory access circuits, wherein ones of interface circuits are configured to receive memory access requests to first level memory banks from an associated memory access circuit, segment the memory access requests into sub-requests to corresponding second level memory banks, and buffer the sub-requests into buffers associated with the second level memory banks; and
- arbitration circuitry configured to control multiplexing paths from the buffers to the second level memory banks to enable, in a same memory access clock, memory accesses from different memory access circuits to different second level memory banks within a same first level memory bank and further configured to control multiplexers to select a buffer from a group of buffers according to time-division-multiplexing (TDM) to cause different sub-requests of a same request to access different second level memory banks of the same first level memory bank in different memory access cycles.

* * * * *